United States Patent
Ro et al.

(10) Patent No.: US 10,299,230 B2
(45) Date of Patent: May 21, 2019

(54) METHOD AND APPARATUS FOR PROVIDING COMMON TIME REFERENCE IN WIRELESS COMMUNICATION SYSTEM

(71) Applicant: Samsung Electronics Co., Ltd., Gyeonggi-do (KR)

(72) Inventors: Sangmin Ro, Seoul (KR); Yongjun Kwak, Gyeonggi-do (KR); Hyoungju Ji, Seoul (KR); Joonyoung Cho, Gyeonggi-do (KR); Younsun Kim, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 276 days.

(21) Appl. No.: 14/864,120

(22) Filed: Sep. 24, 2015

(65) Prior Publication Data
US 2016/0014708 A1    Jan. 14, 2016

Related U.S. Application Data

(63) Continuation of application No. 14/170,772, filed on Feb. 3, 2014, now Pat. No. 9,807,716.

(30) Foreign Application Priority Data

Feb. 1, 2013 (KR) .................. 10-2013-0011883

(51) Int. Cl.
*H04W 56/00* (2009.01)
*H04W 76/14* (2018.01)

(52) U.S. Cl.
CPC ......... *H04W 56/001* (2013.01); *H04W 56/00* (2013.01); *H04W 56/002* (2013.01); *H04W 56/0015* (2013.01); *H04W 76/14* (2018.02)

(58) Field of Classification Search
None
See application file for complete search history.

(56) References Cited

U.S. PATENT DOCUMENTS

| 2009/0016320 A1 | 1/2009 | Li et al. |
| 2010/0165882 A1* | 7/2010 | Palanki ............... H04W 76/14 370/254 |

(Continued)

FOREIGN PATENT DOCUMENTS

| CN | 102165840 | 8/2011 |
| CN | 102422703 | 4/2012 |

(Continued)

OTHER PUBLICATIONS

Gabor Fodor et al., "Design Aspects of Network Assisted Device-to-Device Communications", IEEE Communications Magazine, Mar. 5, 2012.

(Continued)

*Primary Examiner* — Jutai Kao
(74) *Attorney, Agent, or Firm* — The Farrell Law Firm, P.C.

(57) ABSTRACT

Disclosed is a method by a terminal in a communication system, including acquiring synchronization information from a cell, identifying whether information for synchronization transmission is acquired from the cell, and transmitting synchronization information, by the terminal, if the information for synchronization transmission is acquired from the cell, based on the acquired information for synchronization transmission.

20 Claims, 10 Drawing Sheets

(56) References Cited

U.S. PATENT DOCUMENTS

| | | |
|---|---|---|
| 2011/0182280 A1 | 7/2011 | Charbit et al. |
| 2011/0222515 A1 | 9/2011 | Wang et al. |
| 2011/0235561 A1 | 9/2011 | Liu et al. |
| 2011/0312331 A1 | 12/2011 | Hakola et al. |
| 2013/0029675 A1 | 1/2013 | Kwon et al. |
| 2013/0303171 A1 | 11/2013 | Jang et al. |
| 2014/0099950 A1* | 4/2014 | Mildh ............... H04W 56/001 455/434 |
| 2014/0153390 A1* | 6/2014 | Ishii ............... H04W 28/0289 370/230 |
| 2014/0198777 A1 | 7/2014 | Toda |
| 2014/0341208 A1 | 11/2014 | Charbit et al. |
| 2015/0181546 A1* | 6/2015 | Freda ............... H04W 56/0015 370/336 |
| 2016/0014707 A1* | 1/2016 | Ro ............... H04W 56/002 370/336 |
| 2017/0094561 A1 | 3/2017 | Horneman et al. |

FOREIGN PATENT DOCUMENTS

| | | |
|---|---|---|
| CN | 102547871 | 7/2012 |
| CN | 102780993 | 11/2012 |
| JP | 2010-533431 | 10/2010 |
| JP | 2012-511290 | 5/2012 |
| JP | 2013-3000 | 1/2013 |
| WO | WO 2005/034434 | 4/2005 |
| WO | WO 2011/080533 | 7/2011 |
| WO | WO 2011/121374 | 10/2011 |
| WO | WO 2013/002688 | 1/2013 |

OTHER PUBLICATIONS

Chinese Office Action dated Jan. 12, 2018 issued in counterpart application No. 201480006744.2, 26 pages.

Japanese Office Action dated Mar. 5, 2018 issued in counterpart application No. 2015-555916, 7 pages.

\* cited by examiner

METHOD AND APPARATUS FOR PROVIDING COMMON TIME REFERENCE IN WIRELESS COMMUNICATION SYSTEM

PRIORITY

This application is a Continuation Application of U.S. patent application Ser. No. 14/170,772, which was filed in the United States Patent and Trademark Office on Feb. 3, 2014, and claims priority under 35 U.S.C. § 119(a) to Korean Patent Application No. 10-2013-0011883, filed in the Korean Intellectual Property Office on Feb. 1, 2013, the content of each of which is incorporated herein by reference.

BACKGROUND OF THE INVENTION

1. Field of the Invention

The present invention generally relates to a procedure, operating method, and apparatus for autonomously providing a common time reference for device-to-device (D2D) communication of a wireless communication terminal.

2. Description of the Related Art

Wireless mobile communication systems in use today are mainly based on a wired network, and wireless communication is actually applied to a link between a base station and a terminal. Thus, if the wired network, on which a wireless mobile communication system is based, is damaged when various disasters occur, it is impossible to provide normal wireless communication services. In such emergency conditions, device-to-device (D2D) wireless communication may be used as one way to provide backup wireless communication services for the existing wired network-based wireless communication services.

The $3^{rd}$ Generation Partnership Project (3GPP), the standards group for asynchronous cellular mobile communication, is also studying the support for D2D communication while conducting Long Term Evolution (LTE) release 12 standardization. In particular, 3GPP is currently under research and development and standardization aimed at D2D communication between LTE terminals, which supports proximity-based applications and services for terminals at a relatively long distance, as well as emergency backup communication services between terminals.

In order to achieve D2D communication, initially, a process of recognizing the existence of other terminals is required, which is referred to as a discovery process. Each D2D terminal transmits a discovery signal to notify other terminals of its existence. Further, each D2D terminal receives discovery signals transmitted from other terminals to recognize the existence of other terminals. In order to efficiently perform such an operation, a specific time interval where D2D terminals transmit/receive discovery signals must be predefined under the same common time reference. Otherwise, D2D terminals cannot know when neighboring D2D terminals transmit discovery signals, and thus have to always monitor discovery signals, which results in an increase in power consumption of the terminals.

In order to efficiently perform a discovery process for D2D communication, a common time reference has to be provided to D2D terminals. When a cellular network is normally operated, the common time reference may be acquired from a synchronization signal transmitted from a base station.

However, when a cellular network cannot be normally operated due to natural disasters and the like, or when a terminal is located out of the coverage area of the cellular network, there is a problem in that each D2D terminal cannot acquire common time synchronization from a base station.

Accordingly, there is a need for a way to provide a common time reference to D2D terminals. There is also a need to consider a method for providing a common time reference not by a base station but by a D2D terminal.

SUMMARY

The present invention has been made to address at least the above-mentioned problems and disadvantages, and to provide at least the advantages described below.

Accordingly, an aspect of the present invention is to provide an operating method, operation procedure, and apparatus required to support a function of D2D terminal of providing a common time reference.

According to an aspect of the present invention, a method by a terminal in a communication system includes acquiring synchronization information from a cell, identifying whether information for synchronization transmission is acquired from the cell, and transmitting synchronization information, by the terminal, if the information for synchronization transmission is acquired from the cell, based on the acquired information for synchronization transmission.

According to another aspect of the present invention, a terminal for performing D2D communication in a wireless communication system is provided. The terminal includes a transceiver that transmits and receives signals to and from other terminals and a base station; and a controller that controls the transceiver, determines if a signal including synchronization information is received via at least one of an uplink and a downlink, and transmits a synchronization information-containing signal when the signal including the synchronization information is not received.

According to another aspect of the present invention, a terminal in a communication system includes a transceiver for transmitting and receiving a signal; and a controller configured to acquire synchronization information from a cell, identify whether information for synchronization transmission is acquired from the cell, and transmit synchronization information, by the terminal, if the information for the synchronization transmission is acquired from the cell, based on the acquired information for synchronization transmission.

According to another aspect of the present invention, a base station in a communication system includes a controller configured to identify synchronization information, and a transceiver configured to transmit a signal including the identified synchronization information, wherein a terminal is configured to acquire synchronization information from a cell based on the synchronization information identified by the base station, to identify whether information for synchronization transmission is acquired from the cell, and to transmit the synchronization information, if the information for synchronization transmission is acquired from the cell, based on the acquired information for synchronization transmission.

BRIEF DESCRIPTION OF DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Figure 1:
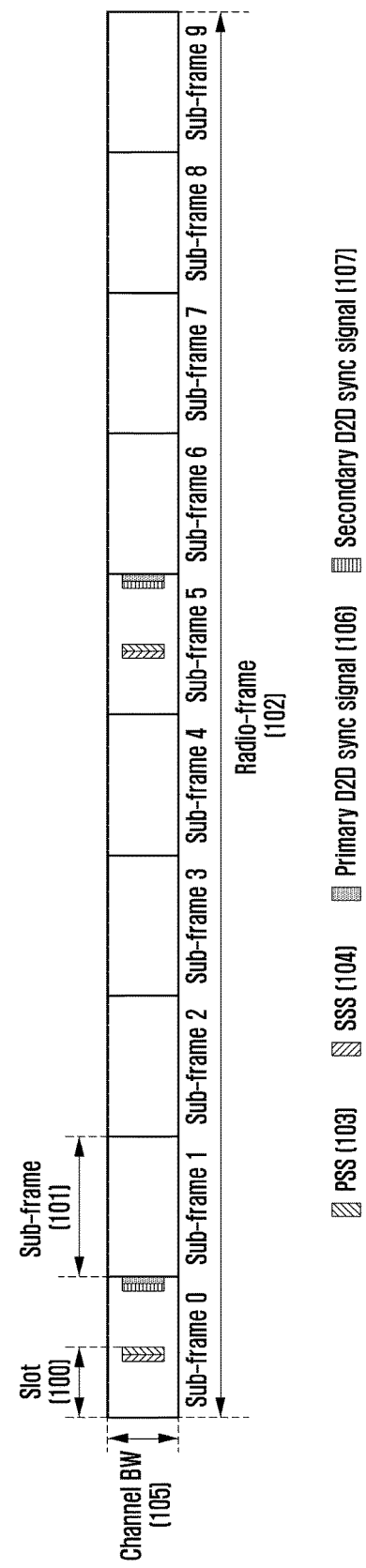
FIG. 1 illustrates an example of a resource through which a base station transmits a synchronization signal via a downlink and a terminal transmits a D2D synchronization signal via a downlink.

Hereinafter, various embodiments of the present invention will be described with reference to the accompanying drawings. Further, in the following description of the present invention, a detailed description of known functions and configurations incorporated herein will be omitted when it may make the subject matter of the present invention unclear. Terms described below are defined in consideration of functions of the present invention, but may vary according to the intention of a user or operator. Therefore, the definitions need to be determined based on the overall contents of the present specification.

In the following embodiments of the present invention, a description will be given of a procedure and operating method for autonomously providing a common time reference for D2D communication by a terminal capable of supporting D2D communication (hereinafter referred to as "D2D terminal") in a wireless communication system.

First, as an example of a means for a D2D terminal to provide a common time reference, a D2D synchronization signal is defined. When a cellular network is not available, the D2D synchronization signal provides the same function as an existing synchronization signal transmitted from a base station. That is, the D2D synchronization signal allows for synchronization acquisition for D2D communication between terminals, and transfers ID-related information indicating by which a common time reference is provided. In embodiments of the present invention, when a cellular network is normally operated, D2D terminals may acquire a common time reference from a base station to which they belong and use the acquired common time reference. As an example, in the case of an LTE system, a terminal acquires time synchronization to a cell to which it belongs and the cell ID of the cell by detecting a synchronization signal including a primary synchronization signal (PSS) and a secondary synchronization signal (SSS), transmitted from a base station, when accessing the base station, and the acquired time synchronization may be used as a common time reference.

A method of operating a D2D terminal according to embodiments of the present invention includes a process in which, when the D2D terminal cannot acquire a common time reference from a cellular network within a certain period of time, a certain number of attempts, or the expiration of a predetermined timer and subsequently cannot acquire a common time reference from any other D2D terminal within another certain period of time, another certain number of attempts, or another expiration of a predetermined timer, it autonomously provides a common time reference.

In embodiments of the present invention, whether a D2D terminal acquires a common time reference provided from a cellular network may be determined by whether the D2D terminal successfully detects a synchronization signal and system information from a base station or whether the D2D terminal successfully detects a synchronization signal.

In embodiments of the present invention, a means for a D2D terminal to autonomously provide a common time reference is a D2D synchronization signal transmitted from the corresponding D2D terminal. Also, the D2D synchronization signal is a signal that is distinguished from a synchronization signal transmitted by a base station.

In embodiments of the present invention, whether a D2D terminal acquires a common time reference from another D2D terminal may be determined by whether the D2D terminal successfully detects a common time reference that another D2D terminal transmits.

A method of operating a D2D terminal according to embodiments of the present invention includes a process in which, when the D2D terminal cannot acquire either a common time reference from a cellular network or a common time reference from any other D2D terminal within a certain period of time, a certain number of attempts, or the expiration of a predetermined timer, it autonomously provides a common time reference.

A method of operating a D2D terminal according to other embodiments of the present invention includes a process in which the D2D terminal starts to provide a common time reference, and then autonomously attempts to acquire both a common time reference from a cellular network and a common time reference from another D2D terminal at certain periods or after a certain period of time, a certain number of times of providing a common time reference, or the expiration of a predetermined timer. If a corresponding D2D terminal acquires a common time reference, then it stops providing a common time reference, and follows the acquired common time reference.

In embodiments of the present invention, a D2D terminal, which has most recently received a configuration set to always provide a common time reference from a base station, follows a common time reference acquired from the base station or another D2D terminal, as described above, and simultaneously the D2D terminal itself may also provide a common time reference corresponding to the corresponding common time reference. This allows the D2D terminal to serve as a detour path for providing a common time reference to D2D terminals that cannot acquire the common time reference from the base station because of being located in a shadow zone within the coverage area of the base station.

In embodiments of the present invention, whether to acquire a common time reference from a cellular network may have priority over whether to acquire common time reference from any other D2D terminal, but this may vary according to configurations. Further, a cellular network may include transmitting and receiving data through LTE or 3G signals transmitted and received via a base station.

In terms of autonomously providing a common time reference, D2D terminals are prioritized by differently setting a predetermined period of time or a predetermined number of acquisition attempts, required until each D2D terminal may autonomously provide a common time reference, according to various factors such as the types or users of the D2D terminals.

Embodiments of the present invention include an operation procedure and method for autonomously providing a common time reference by a terminal supporting a D2D communication function.

When a D2D terminal cannot acquire a common time reference from a cellular network under a given condition and subsequently cannot acquire a common time reference from any other D2D terminal under a given condition, the D2D terminal autonomously provides a common time reference. Alternatively, when a D2D terminal does not succeed in acquiring a common time reference from a cellular network and a common time reference from any other D2D terminal under a given condition, the D2D terminal autonomously provides a common time reference. A means for a D2D terminal to autonomously provide a common time reference is a D2D synchronization signal transmitted from the corresponding D2D terminal, and the D2D synchronization signal is a signal that is distinguished from a synchronization signal transmitted by a base station. The present invention includes a method for efficiently transmitting a D2D synchronization signal via a downlink and an uplink.

Further, if a given condition is satisfied, a D2D terminal, which is providing a common time reference, autonomously attempts to acquire a common time reference from a cellular network or another D2D terminal, and when succeeding in acquiring a common time reference, stops providing a common time reference and follows the acquired common time reference.

In the above process, whether to acquire a common time reference from a cellular network may have priority over whether to acquire a common time reference from another D2D terminal. Further, in terms of autonomously providing a common time reference, D2D terminals are prioritized by differentially setting a condition under which each D2D terminal may autonomously provide a common time reference.

Embodiments of the present invention provide a method for efficiently acquiring a common time reference in a situation where terminals cannot receive cellular network services.

FIG. 1 illustrates an example in which a base station transmits a synchronization signal via a downlink and a D2D terminal also transmits a D2D synchronization signal via the same downlink in a wireless communication system according to embodiments of the present invention.

The following description will be given on the assumption that the wireless communication system is an LTE system. However, it should be clear that those of ordinary skill in the art may also readily apply embodiments of the present invention to other systems.

Referring to FIG. 1, in an LTE system, a set of multiple symbols constitutes a time resource unit called a slot 100. Further, a sub-frame 101 existing as a time resource unit larger than a slot 100 includes two slots 100. Further, data is signaled in units of sub-frames 101. Finally, 10 sub-frames 101 collectively constitute a larger time resource unit called a radio frame 102. Since an LTE downlink employs an OFDM-based transmission scheme, a frequency resource may include multiple sub-carriers.

Under the above-mentioned time resource configuration, a base station transmits the existing LTE synchronization signal via a downlink in sub-frames 0 and 5. The synchronization signal transmitted by a base station (hereinafter referred to as "BS synchronization signal") may include two synchronization signals, a primary synchronization signal (PSS) 103 and a second synchronization signal (SSS) 104. The PSS 103 and the SSS 104 are transmitted over the last two symbols in each first slot of sub-frames 0 and 5, and in the frequency domain, occupy a certain number of sub-carrier resources that are located in the mid-portion of the channel bandwidth 105. Further, each of the PSS 103 and the SSS 104 includes sequences of a length corresponding to the certain number of sub-carriers, and the corresponding sequences may include cell ID-related information. The sequences of the PSS 103 and the SSS 104 are configured to be distinguishable from each other.

That is, the SSS 104 corresponds to a cell group ID, and the PSS 103 corresponds to one of N elements in one cell group. Accordingly, when the number of cell groups is M, one of M×N cell IDs may be extracted from the PSS 103 and SSS 104.

The PSS 103 is transmitted in sub-frames 0 and 5 in the same manner, which makes it possible to acquire sub-frame timing by using the PSS 103. Further, the SSS 104 is configured such that two short sequences are mapped to even-numbered and odd-numbered sub-carriers, respectively, and mapping of the two short sequences when the SSS 104 is transmitted in sub-frame 0 and mapping of the two short sequences when the SSS 104 is transmitted in sub-frame 5 are switched, which makes it possible to acquire radio frame timing by using the SSS 104.

In order to newly introduce a D2D synchronization signal to be transmitted by a D2D terminal via a downlink in a situation where there is already a BS synchronization signal, as in the above-mentioned LTE system, the following method may be applied. The D2D synchronization signal includes a primary D2D synchronization signal 106 and a secondary D2D synchronization signal 107.

These D2D synchronization signals are allocated to a resource other than that of a BS synchronization signal. As an example, the D2D synchronization signals are transmitted over the last two symbols, for example, in each second slot of sub-frames 0 and 5. In the frequency domain, the D2D synchronization signals occupy a certain number of sub-carrier resources that are located in the mid-portion of the channel bandwidth 105. The certain number of sub-carriers may be set to correspond to the minimum channel bandwidth supportable in the system. Therefore, when D2D communication is performed without acquisition of base station system information, a D2D synchronization signal transmission and reception process and then a D2D communication process may be performed on the assumption of the minimum channel bandwidth. Further, the D2D synchronization signal may include different sequences from those of the BS synchronization signal.

Further, in order to allow D2D terminals to distinguish between the BS synchronization signal and the D2D synchronization signal when acquiring synchronization, each of the primary D2D synchronization signal 106 and the secondary D2D synchronization signal 107 includes sequences that are distinguishable from those of the PSS 103 and the SSS 104. The sequences of the primary D2D synchronization signal 106 and the secondary D2D synchronization signal 107 are also configured to be distinguishable from each other. Further, the primary D2D synchronization signal 106 and the secondary D2D synchronization signal 107 include ID-related information to identify which device transmits the D2D synchronization signal, the ID-related information including at least one of information on a group ID and the number of elements in one group.

The primary D2D synchronization signal 106 is transmitted in sub-frames 0 and 5 in the same manner, which makes it possible to acquire sub-frame timing by using the primary D2D synchronization signal 106. Further, the secondary D2D synchronization signal 107 is configured such that two short sequences are mapped to even-numbered and odd-numbered sub-carriers, respectively, and mapping of the two short sequences when the secondary D2D synchronization signal 107 is transmitted in sub-frame 0 and mapping of the two short sequences when the secondary D2D synchronization signal 107 is transmitted in sub-frame 5 are switched, which makes it possible to acquire radio frame timing by using the secondary D2D synchronization signal 107.

In embodiments of the present invention, since the D2D synchronization signal is transmitted in the same sub-frames as the BS synchronization signal, the influence of introduction of the D2D synchronization signal on data scheduling can be minimized. That is, in sub-frames 0 and 5, scheduling restrictions are already placed on a certain number of sub-carrier resources, which are located in the mid-portion of the channel bandwidth 105, in the symbols used to transmit the BS synchronization signal. In particular, when data scheduling is performed in units of sub-frames, there is also the possibility that a scheduler may be implemented not to allocate data to the frequency regions of sub-frames 0 and 5, in each of which the BS synchronization signal is transmitted. Accordingly, sub-frames already having scheduling restrictions are used to transmit the D2D synchronization signal. However, in some embodiments of the present invention, it is also possible to locate a D2D synchronization signal in other sub-frames, and a D2D terminal may easily perform a discovery process with other D2D terminals by acquiring synchronization, based on the D2D synchronization signal.

According to one embodiment of the present invention, if other sub-frames where no BS synchronization signal is transmitted are used for D2D synchronization signal transmission, then scheduling restrictions may be additionally placed on the corresponding sub-frames.

Figure 2:
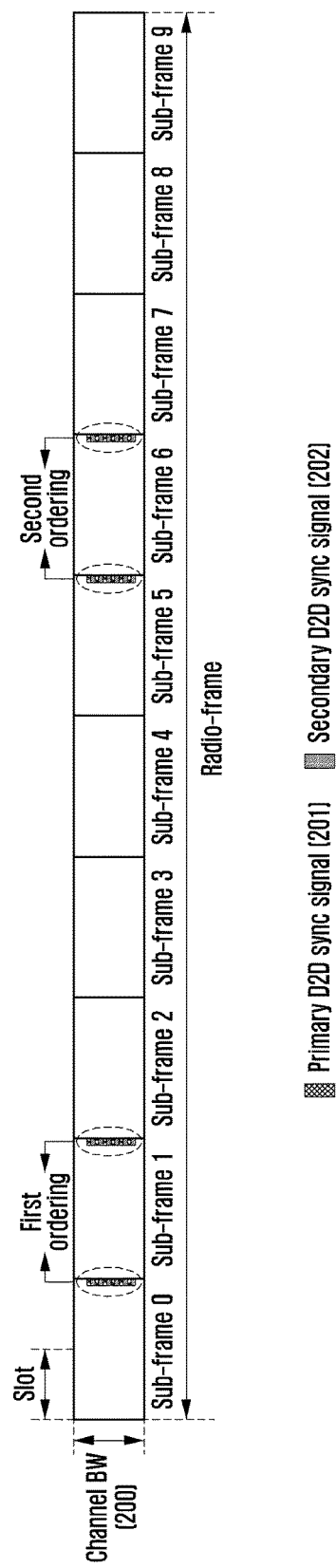
FIG. 2 illustrates an example of a resource through which a terminal transmits a D2D synchronization signal via an uplink.

FIG. 2 illustrates an example in which a D2D terminal transmits a D2D synchronization signal via an uplink in a wireless communication system according to embodiments of the present invention.

The following description will be given on the assumption that the wireless communication system is an LTE system. Time and frequency resource configurations are the same as those in FIG. 1, and any uplink synchronization signal in FIG. 2 corresponds to a D2D synchronization signal because a BS synchronization signal is transmitted via a downlink.

In embodiments of the present invention, a D2D terminal transmits a sounding signal in the last symbol interval of a sub-frame in which sounding transmission is possible according to a configuration from a base station. The D2D terminal may transmit and receive a D2D synchronization signal in an interval corresponding to the sounding signal.

As shown in FIG. 2, the D2D synchronization signal is transmitted over a certain sub-carrier region, which is located in the mid-portion of the channel bandwidth 200, in the last symbol of each of sub-frames 0, 1, 5, and 6. The certain sub-carrier region may be set to correspond to the minimum channel bandwidth supportable in the system. Therefore, when D2D communication is performed without acquisition of base station system information, a D2D synchronization signal transmission and reception process and then a D2D communication process may be performed on the assumption of the minimum channel bandwidth.

The reason why the D2D synchronization signal is allocated to the last symbol of a transmission sub-frame is to make the most of the symbol already used for sounding transmission. Since a sounding signal generally has a long transmission period, and has an advantage in that transmission resources can be easily adjusted by a configuration from a base station, a D2D synchronization signal may be introduced while scheduling complexity and the existing system are less affected by introduction of the D2D synchronization signal, as compared to a method using data or control signal resources.

If another terminal serviced by a base station transmits a sounding signal within a certain distance from a terminal transmitting a D2D synchronization signal, then a collision between the sounding signal and the D2D synchronization signal may occur. Thus, in order to prevent this, the base station may configure terminals within its radius of coverage not to transmit a sounding signal in a sub-frame where a D2D synchronization signal is transmitted. Further, in some embodiments of the present invention, the base station transmits a configuration which indicates whether to transmit a D2D synchronization signal or whether to transmit a sounding signal to the terminals, and such a configuration may be differently determined according to communication conditions.

The D2D synchronization signal transmitted in the last symbol of each of the four sub-frames includes a primary D2D synchronization signal 201 and a secondary D2D synchronization signal 202. In embodiments of the present invention, these two synchronization signals may be separately transmitted in sub-carrier regions divided in the frequency domain.

As an example, the primary D2D synchronization signal 201 is mapped to even-numbered sub-carriers, and secondary D2D synchronization signal 202 is mapped to odd-numbered sub-carriers in a frequency region that is located in the mid-portion of the channel bandwidth 200 and is allocated for D2D synchronization signal transmission. The divided sub-carrier regions may have various configurations such as even-numbered/odd-numbered sub-carriers and upper/lower sub-carriers.

As shown in FIG. 2, the D2D synchronization signal is transmitted four times in one radio frame, and sub-carrier regions to which the primary D2D synchronization signal 201 and the secondary D2D synchronization signal 202 are mapped may vary according to these points of time when the D2D synchronization signal is transmitted. As an example, sub-carrier regions to which the two D2D synchronization signals are mapped respectively in sub-frames {0, 1} may be interchanged with those in sub-frames {5,6}, or sub-carrier regions to which the two D2D synchronization signals are mapped respectively in sub-frames {0, 5} may be interchanged with those in sub-frames {1,6}. Radio frame timing may be acquired using the mapping variation according to the points of time of D2D synchronization signal transmission.

Further, the primary D2D synchronization signal 201 includes the same one sequence, which is transmitted in all of sub-frames {0, 1, 5, 6}, and the secondary D2D synchronization signal includes two short sequences, one of which is transmitted in sub-frames {0, 1} and the other of which is transmitted in sub-frames {5, 6}. The primary D2D synchronization signal 201 and the secondary D2D synchronization signal 202 are interleaved to constitute each sequence. Using this, it is possible to acquire sub-frame timing. In terms of the number and positions of sub-frames for D2D synchronization signal transmission and the transmission pattern at each point of time of D2D synchronization signal transmission, various changes and modifications may be made to the above-mentioned method.

Compared with FIG. 1, the reason why the number of times of D2D synchronization signal transmission in one radio frame is increased from 2 to 4 is to guarantee the detection performance of the D2D synchronization signal. That is, each of the primary and secondary D2D synchronization signals fully use the overall frequency region allocated for D2D synchronization signal transmission in FIG. 1, but the two D2D synchronization signals co-exist in the same frequency region in FIG. 2, and thus the size of the frequency region used by each of the primary and secondary D2D synchronization signals is reduced by half, as compared to FIG. 1. Accordingly, in order to compensate for this, the number of times of transmission is increased two-fold. However, in some embodiments of the present invention, the number of times of the D2D synchronization signal transmission may be changed.

Figure 3:
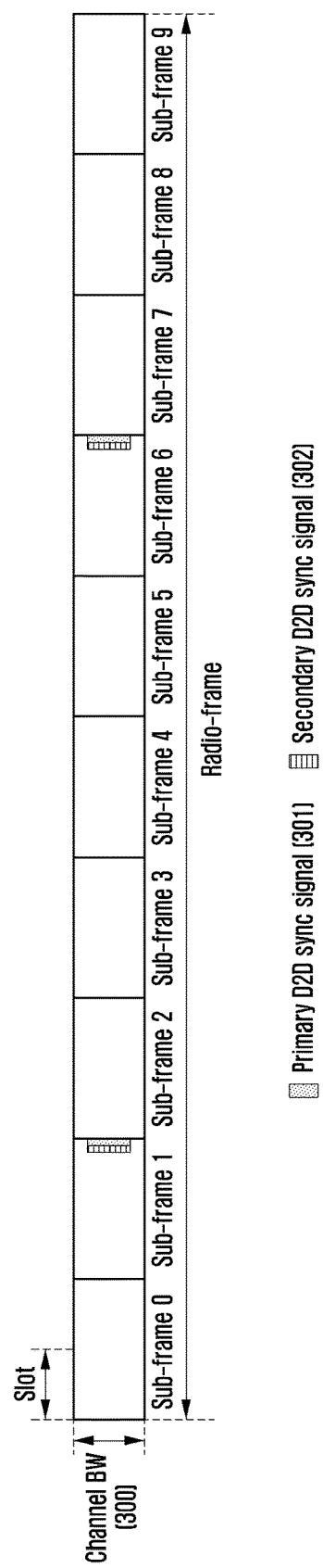
FIG. 3 illustrates another example of a resource through which a terminal transmits a D2D synchronization signal via an uplink.

FIG. 3 illustrates another example in which a D2D terminal transmits a D2D synchronization signal via an uplink in a wireless communication system according to embodiments of the present invention.

Referring to FIG. 3, the following description will be given on the assumption that the wireless communication system is an LTE TDD (Time Division Duplex) system. However, it will be apparent to those skilled in the art that the method according to embodiments of the present invention as described below in FIG. 3 may be applied to other communication systems.

Time and frequency resource configurations are the same as those in FIG. 1, and any uplink synchronization signal in FIG. 3 corresponds to a D2D synchronization signal because a BS synchronization signal is transmitted via a downlink. In an LTE TDD system, sub-frames in one radio frame are divided into uplink sub-frames and downlink sub-frames, and the uplink and downlink sub-frames are separately used. In particular, a plurality of downlink/uplink configurations are predefined according to the numbers and positions of downlink/uplink sub-frames in a radio frame, and a base station selects one of them and uses the selected downlink/uplink configuration.

As shown in FIG. 3, the D2D synchronization signal is transmitted over a certain sub-carrier region, which is located in the mid-portion of the channel bandwidth 300, in the last two symbol intervals of each of sub-frames 1 and 6. The certain sub-carrier region may be set to correspond to the minimum channel bandwidth supportable in the system, and may be changed in position according to embodiments of the present invention. Therefore, when D2D communication is performed without acquisition of base station system information, a D2D synchronization signal transmission and reception process and then a D2D communication process may be performed on the assumption of the minimum channel bandwidth. In particular, the primary and secondary D2D synchronization signals are transmitted in different symbol intervals. In the scenario of FIG. 3, the reason why the D2D synchronization signal is transmitted in sub-frames 1 and 6 is as follows.

Since sub-frames 1 and 6 are sub-frames that may be configured as special sub-frames for switching between downlink and uplink sub-frames, and the last few symbols of each of such sub-frames may be used to transmit a sounding signal, it is intended to use these symbols for D2D synchronization signal transmission. If another terminal serviced by the LTE TDD system transmits a sounding signal within a certain distance from a terminal transmitting a D2D synchronization signal, then a collision between the sounding signal and the D2D synchronization signal may occur. Thus, in order to prevent this, the base station may configure terminals within its radius of coverage not to transmit a sounding signal in a sub-frame where a D2D synchronization signal is transmitted. In some embodiments of the present invention, the base station transmits a configuration which indicates whether to transmit a D2D synchronization signal, the transmission timing of the D2D synchronization signal, and whether to transmit a sounding signal, to the terminals. Further, such a configuration may be variably determined corresponding to communication conditions.

In embodiments of the present invention, for all the downlink/uplink configurations of the LTE TDD system, sub-frame 1 may be used for sounding signal transmission, and a terminal may transmit a sounding signal in the last one symbol or two symbols of sub-frame 1, depending on the configuration received from the base station. However, in some embodiments of the present invention, a sounding signal may be transmitted in other sub-frames.

The example shown in FIG. 3 assumes that the configuration received from the base station indicates that a sounding signal may be transmitted in the last two symbol intervals, and the corresponding symbol intervals are used for D2D synchronization signal transmission. To the contrary, according to the downlink/uplink configuration, sub-frame 6 is a sub-frame where uplink sounding signal transmission is possible, or is used as a downlink sub-frame. Accordingly, in order to smoothly perform D2D synchronization signal transmission in sub-frame 6, the base station needs to use a downlink/uplink configuration in which sub-frame 6 is not used as a downlink sub-frame. In embodiments of the present invention, a D2D terminal may transmit the D2D synchronization signal in sub-frame 1 and sub-frame 6.

Figure 4:
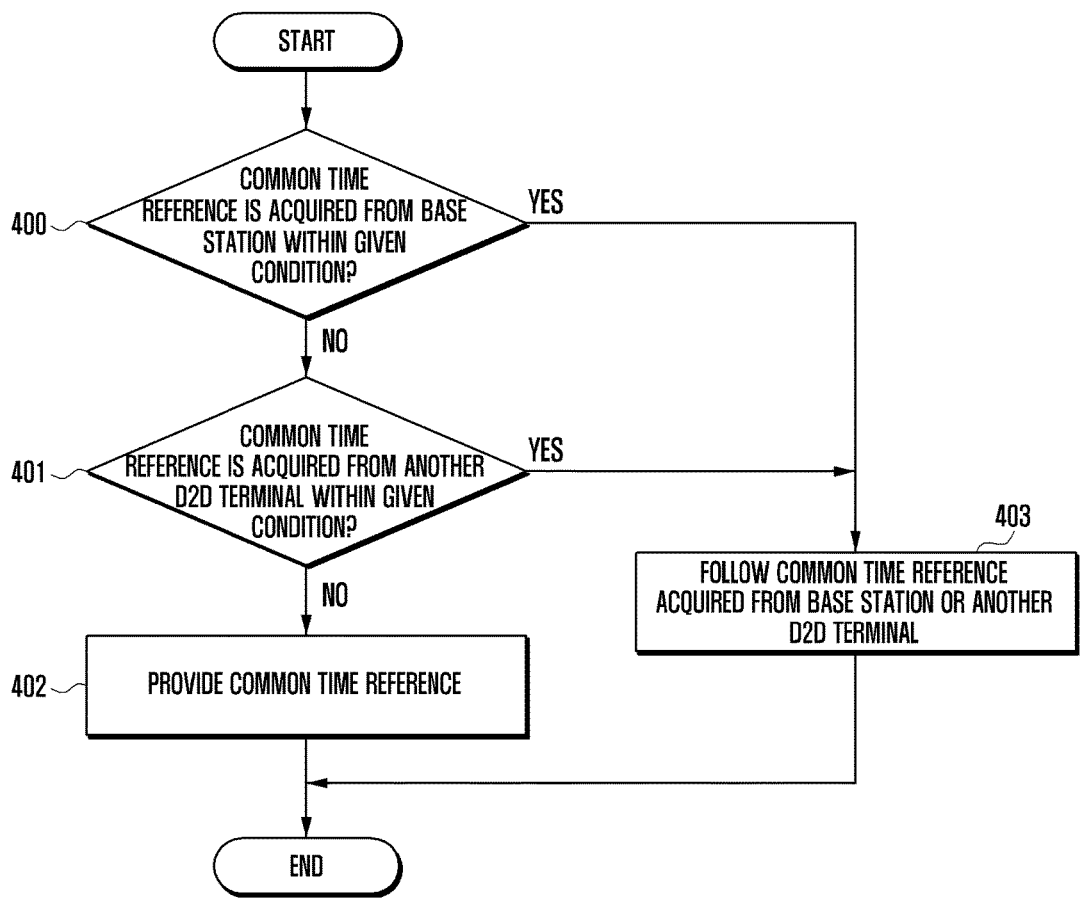
FIG. 4 is a flowchart illustrating an example of a procedure in which a D2D terminal autonomously provides a common time reference in a wireless communication system according to the present invention.

FIG. 4 is a flowchart which illustrates an example of a procedure in which a D2D terminal autonomously provides a common time reference in a wireless communication system according to the present invention.

In this example, it is assumed that the terminal starts to acquire initial synchronization in a situation where a cellular network cannot provide services to the terminal.

Referring to FIG. 4, in step 400, the terminal attempts to acquire a common time reference from a base station, and determines if a common time reference is acquired under a given condition. Here, the given condition means that at least one of the elapse of a certain period of time, the arrival of a certain number of attempts to acquire a common time reference, and the expiration of a predetermined timer is satisfied. Further, by differently setting the given condition according to the types of terminals and users, terminals may be prioritized in terms of providing a common time reference. In embodiments of the present invention, different priorities may be given to users, and a terminal with a higher priority may preferentially acquire synchronization.

The priorities of terminals may be set as unique values when the terminals are manufactured, or may be set by a configuration received from a base station. For example, for users who are responsible to resolve an emergency situation, such as firemen, police, and military personnel, the given condition may be set to a shorter period of time, and thereby higher priorities may be given to them than general users. When a common time reference is first provided from a terminal with a higher priority, terminals with lower priorities do not autonomously provide a common time reference, and acquire the common time reference from the terminal with a higher priority and applies the acquired common time reference. Accordingly, in this way, other terminals adjacent to the terminal with a higher priority may acquire synchronization, based on the common time reference provided from the terminal with a higher priority.

Further, acquiring a common time reference means that a synchronization signal and system information from a base station are successfully detected or a synchronization signal from a base station is successfully detected.

If it is determined in step 400 that a common time reference is not acquired under the given condition, then the terminal proceeds to step 401, and attempts to acquire a common time reference, based on a signal received from another D2D terminal, and determines if a common time reference is acquired under a given condition. Here, the given condition is the same as described in step 400. However, the length of a period of time, the value of a number of acquisition attempts, or the expiration time of a timer may be set differently from that in step 400. Further, acquisition of a common time reference means that a D2D synchronization signal from another D2D terminal is successfully detected.

If it is determined in step 401 that a common time reference is not acquired from any other D2D terminal, then the terminal proceeds to step 402, and the terminal itself provides a common time reference. In some embodiments of the present invention, a method of transmitting the common time reference provided by the terminal itself may include transmitting a synchronization signal in time and frequency intervals that the terminal determines in either a random or predetermined manner.

Subsequently, the terminal ends the algorithm according to the present invention.

If it is determined in step 400 that the terminal acquires a common time reference from the base station under the given condition, or it is determined in step 401 that the terminal acquires a common time reference from another D2D terminal under the given condition, then the terminal proceeds to step 403, and may acquire synchronization corresponding to the common time reference acquired from the base station or another D2D terminal. Subsequently, the terminal ends the algorithm according to the present invention.

In some embodiments of the present invention, a discovery process may be performed in the next step.

Figure 5:
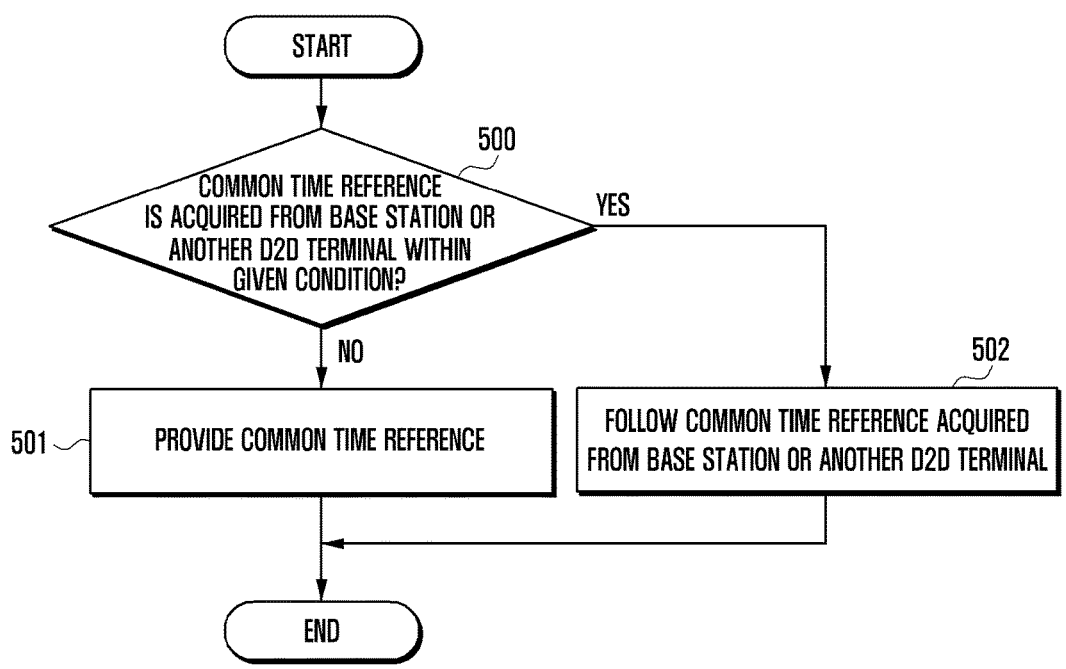
FIG. 5 is a flowchart illustrating another example of a procedure in which a D2D terminal autonomously provides a common time reference in a wireless communication system according to the present invention.

FIG. 5 is a flowchart which illustrates another example of a procedure in which a D2D terminal autonomously provides a common time reference in a wireless communication system according to the present invention.

In this example, it is assumed that the terminal starts acquiring initial synchronization in a situation where a cellular network cannot provide services to the terminal. However, even when the cellular network can provide services to the terminal, the procedure of FIG. 5 may be implemented.

Referring to FIG. 5, in step 500, the terminal attempts to acquire a common time reference from either a base station or another D2D terminal, and determines if a common time reference is acquired under a given condition. In all embodiments of the present invention, the terminal may attempt to acquire a common time reference from at least one of a base station and another D2D terminal.

Here, the given condition means that at least one of the elapse of a certain period of time, the arrival of a certain number of attempts to acquire a common time reference, and the expiration of a predetermined timer is satisfied. However, the length of a period of time, the value of a number of acquisition attempts, or the expiration time of a timer may be set differently from that in the example of FIG. 4. Further, acquiring a common time reference means that a synchronization signal and system information from a base station are successfully detected, a synchronization signal from a base station is successfully detected, or a D2D synchronization signal from another D2D terminal is successfully detected.

If it is determined in step 500 that a common time reference is not successfully acquired from either the base station or another D2D terminal, then the terminal proceeds to step 501, and the terminal itself provides a common time reference. Subsequently, the terminal ends the algorithm according to the present invention.

If it is determined in step 500 that a common time reference is successfully acquired from the base station or another D2D terminal, then the terminal proceeds to step 502, and acquires synchronization corresponding to the acquired common time reference. When the terminal acquires a common time reference from both the base station and another D2D terminal, it may preferentially follow the common time reference from the base station. Subsequently, the terminal ends the algorithm according to the present invention.

In some embodiments of the present invention, a discovery process may be performed in the next step.

Figure 6:
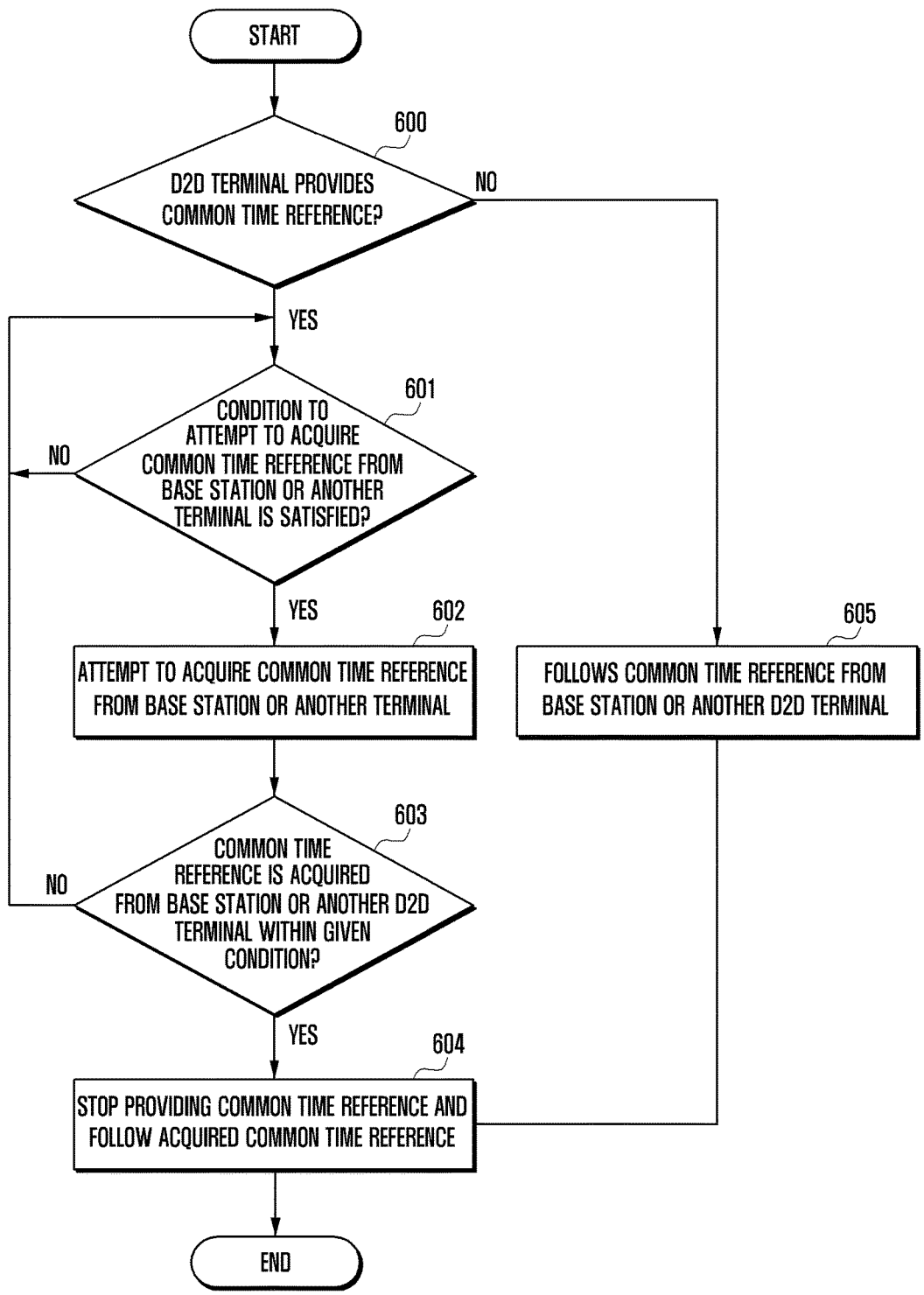
FIG. 6 is a flowchart illustrating an example of a procedure in which a D2D terminal autonomously terminates provision of a common time reference in a wireless communication system according to the present invention.

FIG. 6 is a flowchart which illustrates an example of a procedure in which a D2D terminal autonomously terminates provision of a common time reference in a wireless communication system according to the present invention.

Referring to FIG. 6, whether the terminal provides a common time reference is determined in step 600, and the terminal proceeds to step 601 when the terminal provides a common time reference. In step 601, the terminal determines if a condition under which to attempt to acquire a common time reference from a base station or another D2d terminal is satisfied. Here, the condition under which to attempt to acquire a common time reference means that at least one of the elapse of a certain cyclic period of time during which to attempt to acquire a common time reference, the elapse of a certain period of time starting from a point of time of provision of a common time reference, and the expiration of a predetermined timer is satisfied.

If it is determined in step 601 that the condition under which to attempt to acquire a common time reference is satisfied, then the terminal proceeds to step 602, and attempts to acquire a common time reference from the base station or another D2D terminal. Subsequently, in step 603, the terminal determines if a common time reference is acquired from the base station or another D2D terminal under a given condition. Here, the given condition means that at least one of a predetermined period, the arrival of a predetermined period, the elapse of a certain period of time, the arrival of a certain number of attempts to acquire a common time reference, and the expiration of a predetermined timer is satisfied. However, the length of a period of time, the value of a number of acquisition attempts, or the expiration time of a timer may be set differently from those in FIGS. 4 and 5.

If a common time reference is acquired, the terminal proceeds to step 604, and the terminal stops providing the common time reference and acquires synchronization, based on the acquired common time reference. When the terminal acquires a common time reference from both the base station and another D2D terminal, it may preferentially follow the common time reference from the base station. Subsequently, the terminal ends the algorithm according to the present invention.

Further, when the terminal acquires a common time reference from at least one of the base station and another D2D terminal, the terminal may transmit a signal including common time reference information according to the acquired common time reference to another terminal or the base station. In some embodiments of the present invention, signals including common time reference information, which are transmitted when the terminal acquires a common time reference from the base station, when the terminal acquires a common time reference from another terminal, and when the terminal itself provides a common time reference, may be transmitted in different manners. More specially, these signals may be differentiated by being transmitted through the signal transmission methods described in FIGS. 1 to 3.

In embodiments of the present invention, when a terminal acquires a plurality of common time references, it may preferentially employ common time reference information included in a signal transmitted based on a common time reference acquired from a base station. Further, a terminal may preferentially employ common time reference information included in a signal transmitted based on a common time reference acquired from another terminal, rather than common time reference information acquired based on a common time reference provided by the terminal itself.

If it is determined in step 600 that the terminal does not provide a common time reference, the terminal proceeds to step 605, and follows a common time reference acquired from the base station or another D2D terminal.

Further, if it is determined in step 601 that the condition under which to attempt to acquire a common time reference is not satisfied or it is determined in step 603 that a common time reference is not acquired from the base station or another D2D terminal under the given condition, then the terminal may continue to provide the common time reference.

Figure 7:
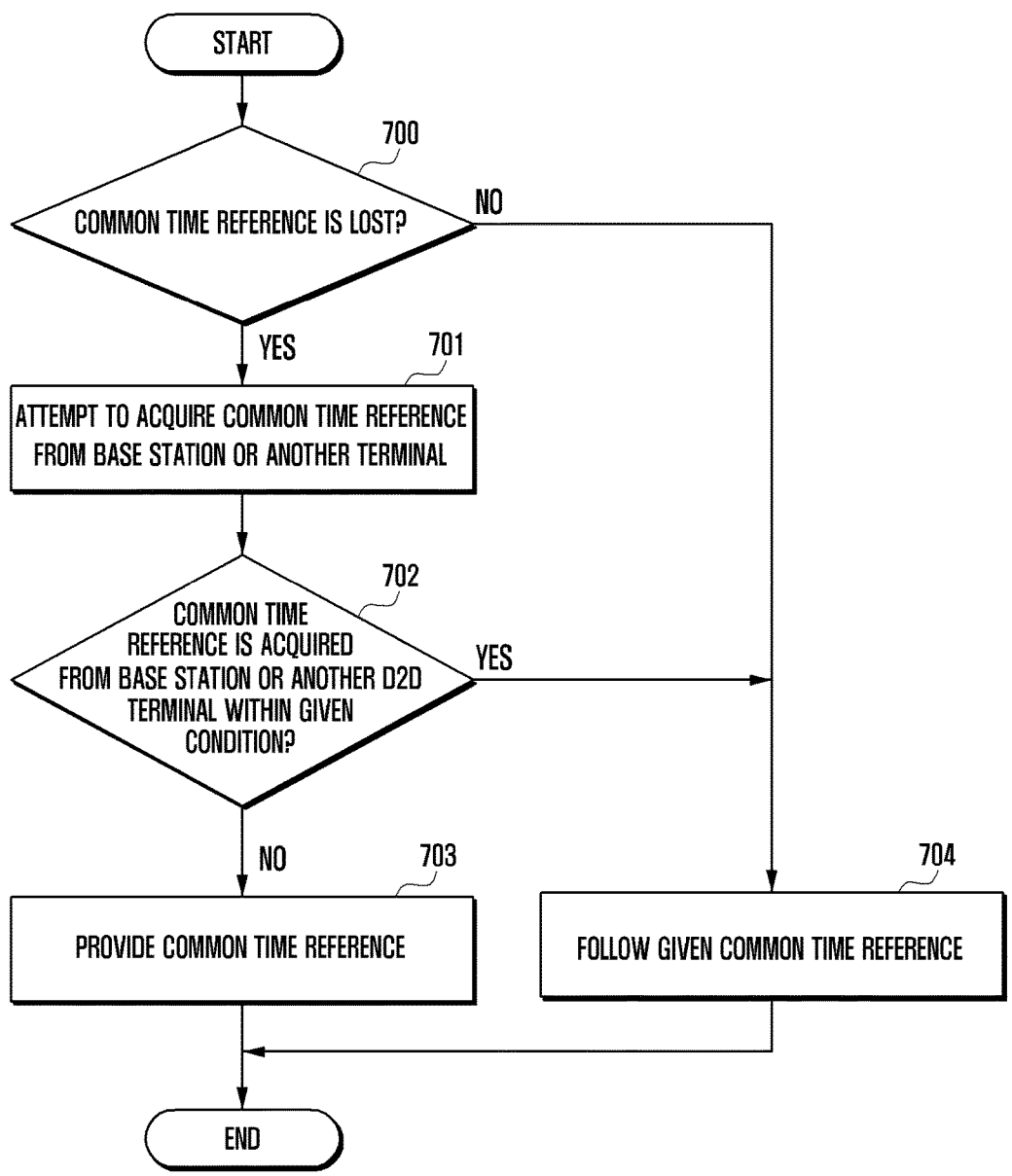
FIG. 7 is a flowchart illustrating an example of a procedure performed when a D2D terminal, which has been provided with a common time reference, loses the common time reference in a wireless communication system according to the present invention.

FIG. 7 is a flowchart which illustrates an example of a procedure performed when a D2D terminal, which has been provided with a common time reference, loses the common time reference in a wireless communication system according to the present invention.

Referring to FIG. 7, in step 700, the terminal determines if the common time reference provided thereto is lost. Here, the loss of a common time reference includes a situation where it is impossible to acquire a common time reference for a certain period of time or when a predetermined timer expires. If the common time reference is lost, then the terminal proceeds to step 701, and attempts to acquire a common time reference from a base station or another D2D terminal.

Subsequently, in step 702, the terminal determines if a common time reference is acquired from the base station or another D2D terminal under a given condition, and when a common time reference is not acquired, the terminal provides a common time reference in step 703. Here, the given condition means that at least one of a predetermined period, the arrival of a predetermined period, the elapse of a certain period of time, the arrival of a certain number of attempts to acquire a common time reference, and the expiration of a predetermined timer is satisfied. However, the length of a period of time, the value of a number of acquisition attempts, or the expiration time of a timer may be set differently from those in FIGS. 4 to 6. Subsequently, the terminal ends the algorithm according to the present invention.

If the common time reference is not lost in step 700, then the terminal proceeds to step 704, and maintains synchronization corresponding to the given common time reference. If it is determined in step 702 that a common time reference is acquired from the base station or another D2D terminal, then the terminal proceeds to step 704, and maintains synchronization corresponding to the acquired common time reference. When the terminal acquires a common time reference from both the base station and another D2D terminal, it may preferentially follow the common time reference from the base station. Subsequently, the terminal ends the algorithm according to the present invention.

Figure 8:
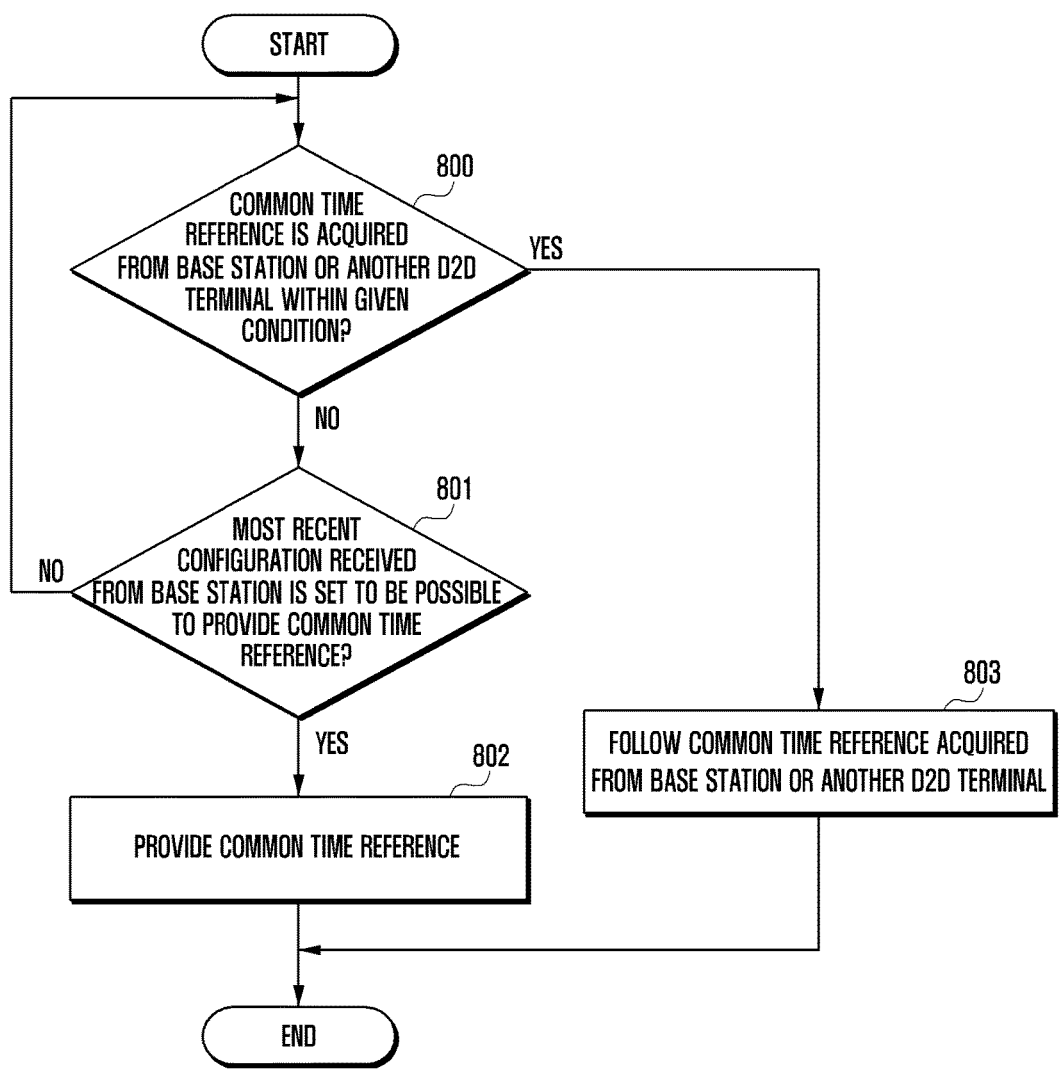
FIG. 8 is a flowchart illustrating an example of a procedure in which a D2D terminal provides a common time reference, based on signaling most recently received from a base station, which indicates whether it is possible for the terminal to provide a common time reference, in a wireless communication system according to the present invention.

FIG. 8 is a flowchart which illustrates an example of a procedure in which a D2D terminal provides a common time reference, based on signaling most recently received from a base station, which indicates whether it is possible for the terminal to provide a common time reference, in a wireless communication system according to the present invention. In this example, it is assumed that the terminal starts acquiring initial synchronization in a situation where a cellular network cannot provide services to the terminal. However, the example described in FIG. 8 may also be applied in the same manner when the terminal acquires a common time reference from the base station as in another example, and receives a configuration from the base station, which indicates whether it is possible for the terminal to provide a common time reference. Further, even when the terminal does not receive a configuration indicating whether it is possible for the terminal to provide a common time reference, it may determine whether to provide the acquired common time reference, based on a predetermined condition.

Referring to FIG. 8, in step 800, the terminal determines if a common time reference is acquired from the base station or another D2D terminal under a given condition. Here, the given condition means that at least one of a predetermined period, the arrival of a predetermined period, the elapse of a certain period of time, the arrival of a certain number of attempts to acquire a common time reference, and the expiration of a predetermined timer is satisfied.

When a common time reference is not successfully acquired, the terminal proceeds to step 801, and determines if a configuration most recently received from the base station is set to be able to provide a common time reference. Such a configuration may be received from another D2D terminal. Further, in some embodiments of the present invention, such a configuration may be included in the form of an indicator in a signal received from the base station or another D2D terminal, and the terminal may provide a common time reference, based on the indicator.

If the configuration received from the base station is set to be able to provide a common time reference, then the terminal proceeds to step 802, and the terminal provides a common time reference. Subsequently, the terminal ends the algorithm according to the present invention. Upon receiving the most recent configuration set to be able to provide a common time reference, the terminal provides a common time reference, and then even when acquiring a common time reference from the base station or another D2D terminal, may also continue to provide a common time reference corresponding to the acquired configuration, and the terminal itself may continue to provide a common time reference so long as there is no change in the configuration. In some embodiments of the present invention, a case may be assumed in which the terminal acquires a common time reference from the base station or another D2D terminal while providing a common time reference. In such a case, the terminal may perform at least one of an operation of adjusting synchronization in corresponding to the newly acquired common time reference and an operation of providing the newly acquired common time reference to other D2D terminals.

If it is determined in step 800 that a common time reference is acquired under the given condition, then the terminal proceeds to step 803, and follows the acquired common time reference. When the terminal successfully acquires a common time reference from both the base station and another D2D terminal, it may preferentially follow the common time reference from the base station. Subsequently, the terminal ends the algorithm according to the present invention.

If it is determined in step 801 that the most recent configuration received from the base station is set to be unable to provide a common time reference, then the terminal does not provide a common time reference, and returns to step 800 and attempts to acquire a common time reference.

Figure 9:
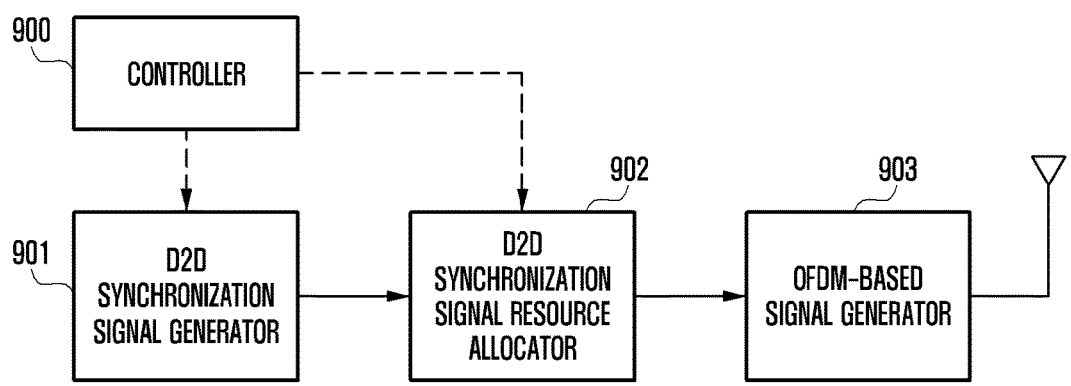
FIG. 9 is a block diagram illustrating a structure of a D2D terminal transmitter in a wireless communication system according to the present invention.

FIG. 9 is a block diagram which illustrates a structure of a D2D synchronization signal transmitter of a D2D terminal in a wireless communication system according to the present invention. It is assumed that the wireless communication system uses an OFDM (Orthogonal Frequency Division Multiplexing)-based transmission technology. However, in some embodiments of the present invention, the terminal may use any other transmission technology.

Referring to FIG. 9, when the D2D terminal is determined to provide a common time reference, the controller 900 controls the D2D terminal to generate a D2D synchronization signal as a means to provide a common time reference. When the controller 900 instructs the D2D synchronization signal generator 901 to generate a D2D synchronization signal, the D2D synchronization signal generator 901 generates primary and secondary D2D synchronization signals constituting the D2D synchronization signal.

These two D2D synchronization signals may include different sequences. The generated D2D synchronization signal is input into the D2D synchronization signal resource allocator 902, and the D2D synchronization signal resource allocator 902 allocates the D2D synchronization signal to transmission time and frequency resource regions, as described in connection with the examples of FIGS. 1 to 3. The controller 900 is involved in the resource region mapping such that different mapping patterns may be applied according to points of time of D2D synchronization signal transmission, as in the example of FIG. 2. Upon being mapped to resources, the D2D synchronization signal is generated into an OFDM symbol signal by passing through the OFDM-based signal generator 903, and then the OFDM symbol signal is transmitted.

Figure 10:
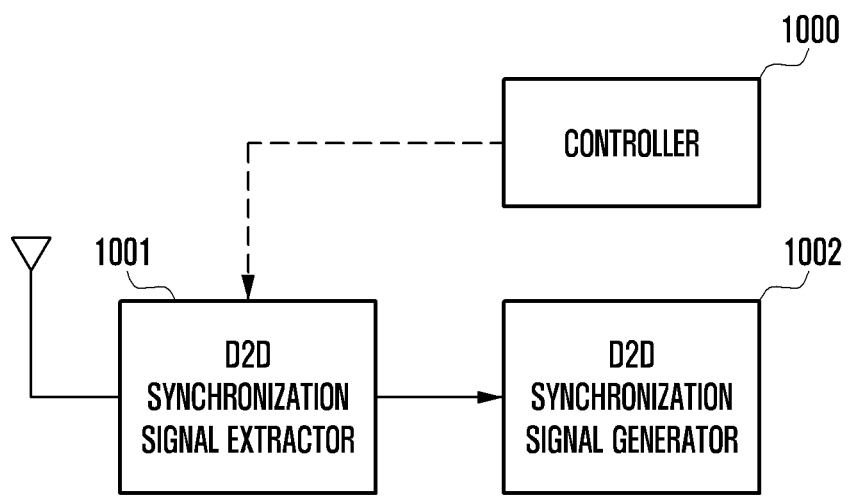
FIG. 10 is a block diagram illustrating a structure of a D2D terminal receiver in a wireless communication system according to the present invention.

FIG. 10 is a block diagram which illustrates a structure of a D2D synchronization signal receiver of a D2D terminal in a wireless communication system according to the present invention. Although the wireless communication system is assumed as an LTE system, the terminal may be operated in other communication systems.

Referring to FIG. 10, a received D2D synchronization signal is input into the D2D synchronization signal extractor 1001, and the D2D synchronization signal extractor 1001 extracts a D2D synchronization signal from time and frequency resource regions, to which the D2D synchronization signal is mapped when it is transmitted, under the control of the controller 1000. With regard to this, the controller 1000 controls the D2D synchronization signal extractor 1001 to extract the D2D synchronization signal in consideration of mapping patterns differently applied according to points of time of D2D synchronization signal transmission, as described above. The extracted D2D synchronization signal is finally detected by the D2D synchronization signal detector 1002. The Rx (receive) terminal may acquire synchronization and the ID of the D2D synchronization signal provider.

Embodiments of the present invention make it possible for D2D terminals to autonomously acquire a common time reference through a D2D synchronization signal and efficiently perform D2D communication when they cannot acquire the common time reference from a cellular network. Further, since it is possible to prioritize D2D terminals in terms of autonomously providing a common time reference, confusion resulting from the situation where many D2D terminals each provide common time references can be reduced. Further, a D2D terminal providing a common time reference can autonomously recognize a cellular network, which is normally operated, to terminate provision of the common time reference and acquire a common time reference from the corresponding cellular network.

Further, in embodiments of the present invention, a D2D terminal includes a transceiver that transmits and receives data to and from at least one of a base station and another D2D terminal, and a control module that controls the operation of the transceiver and controls the operation of the D2D terminal, based on data transmitted and received via the transceiver.

Further, in embodiments of the present invention, a base station includes a transceiver that transmits and receives data to and from at least one of a D2D terminal and another base station, and a control module that controls the operation of the transceiver and controls the operation of the D2D terminal, based on data transmitted and received via the transceiver.

Although specific embodiments have been described in the detailed description of the present invention, various changes and modifications may be made without departing from the spirit and scope of the present invention. Therefore, the scope of the present invention should not be defined as being limited to the embodiments, but should be defined by the appended claims and equivalents thereof.

What is claimed is:
1. A method by a terminal in a communication system, the method comprising:
 identifying whether first synchronization information is acquired from a cell;

identifying whether information to control synchronization transmission of the terminal is acquired from the cell; and transmitting, by the terminal, second synchronization information based on the first synchronization information, if the first synchronization information and the information to control synchronization transmission of the terminal are acquired from the cell, wherein the information to control the synchronization transmission of the terminal indicates whether the terminal transmits a synchronization signal.

2. The method of claim 1, further comprising:
transmitting, by the terminal, the second synchronization information based on a predetermined condition, if the information to control synchronization transmission of the terminal is not acquired.

3. The method of claim 1, further comprising:
attempting to acquire third synchronization information from another terminal, if the first synchronization information from the cell is not acquired; and
acquiring synchronization information by the terminal, if the third synchronization information from the another terminal is not acquired.

4. The method of claim 3, wherein a reference time of the terminal is set based on the cell, if the first synchronization information from the cell is acquired, and the reference time of the terminal is set based on the another terminal, if the third synchronization information from the another terminal is acquired.

5. The method of claim 3, wherein the first synchronization information from the cell is transmitted on a downlink signal of the communication system, and the third synchronization information from the another terminal is transmitted on an uplink signal of the communication system.

6. A terminal in a communication system, the terminal comprising:
a transceiver configured to transmit and receive signals; and
a controller coupled with the transceiver and configured to:
identify whether first synchronization information is acquired from a cell,
identify whether information to control synchronization transmission of the terminal is acquired from the cell, and
transmit second synchronization information based on the first synchronization information, if the first synchronization information and the information for the synchronization transmission are acquired from the cell,
wherein the information to control the synchronization transmission of the terminal indicates whether the terminal transmits a synchronization signal.

7. The terminal of claim 6, wherein the controller is further configured to:
transmit the second synchronization information based on a predetermined condition, if the information to control synchronization transmission of the terminal is not acquired.

8. The terminal of claim 6, wherein the controller is further configured to:
attempt to acquire third synchronization information from another terminal, if the first synchronization information from the cell is not acquired, and
acquire synchronization information by the terminal, if the third synchronization information from the another terminal is not acquired.

9. The terminal of claim 8, wherein a reference time of the terminal is set based on the cell, if the first synchronization information from the cell is acquired, and the reference time of the terminal is set based on the another terminal, if the third synchronization information from the another terminal is acquired.

10. The terminal of claim 8, wherein the first synchronization information from the cell is transmitted on a downlink signal of the communication system, and the third synchronization information from the another terminal is transmitted on an uplink signal of the communication system.

11. A method by a base station in a communication system, the method comprising:
identifying first synchronization information; and
transmitting a message including the identified synchronization information,
wherein it is identified by a terminal, whether the first synchronization information from a cell is acquired,
wherein it is identified by the terminal, whether information to control synchronization transmission of the terminal is acquired from the cell, and
wherein second synchronization information is transmitted by the terminal based on the first synchronization information, if the synchronization information and the information to control synchronization transmission of the terminal are acquired by the terminal from the cell, and
wherein the information to control the synchronization transmission of the terminal indicates whether the terminal transmits a synchronization signal.

12. The method of claim 11, wherein the second synchronization information is transmitted based on a predetermined condition, if the information to control synchronization transmission of the terminal is not acquired.

13. The method of claim 11, wherein it is attempted by the terminal to acquire third synchronization information from another terminal, if the first synchronization information from the cell is not acquired, and
wherein synchronization information is acquired by the terminal, if the third synchronization information from the another terminal is not acquired.

14. The method of claim 13, wherein a reference time of the terminal is set based on the cell, if the first synchronization information from the cell is acquired, and the reference time of the terminal is set based on the another terminal, if the third synchronization information from the another terminal is acquired.

15. The method of claim 13, wherein the first synchronization information from the cell is transmitted on a downlink signal of the communication system, and the third synchronization information from the another terminal is transmitted on an uplink signal of the communication system.

16. A base station in a communication system, the base station comprising:
a transceiver configured to transmit and receive signals, and
a controller is coupled with the transceiver and configured to:
identify first synchronization information, and
transmit a message including the identified synchronization information,
wherein it is identified by a terminal, whether the first synchronization information from a cell is acquired,
wherein it is identified by the terminal, whether information to control synchronization transmission of the terminal is acquired from the cell, wherein second synchronization information is transmitted by the terminal based on the first synchronization information, if the synchronization information and the information to control synchronization transmission of the terminal are acquired by the terminal from the cell, and wherein the information to control the synchronization transmission of the terminal indicates whether the terminal transmits a synchronization signal.

17. The base station of claim 16, wherein the second synchronization information is transmitted based on a predetermined condition, if the information to control synchronization transmission of the terminal is not acquired.

18. The base station of claim 16, wherein it is attempted by the terminal to acquire third synchronization information from another terminal, if the first synchronization information from the cell is not acquired, and wherein synchronization information is acquired by the terminal, if the third synchronization information from the another terminal is not acquired.

19. The base station of claim 18, wherein a reference time of the terminal is set based on the cell, if the first synchronization information from the cell is acquired, and the reference time of the terminal is set based on the another terminal, if the third synchronization information from the another terminal is acquired.

20. The base station of claim 18, wherein the first synchronization information from the cell is transmitted on a downlink signal of the communication system, and the third synchronization information from the another terminal is transmitted on an uplink signal of the communication system.

* * * * *